United States Patent [19]

Crumbach et al.

[11] Patent Number: 4,564,408
[45] Date of Patent: Jan. 14, 1986

[54] PROCESS AND DEVICE FOR COVERING A LENS PREFORM WITH A PROTECTIVE SHEET

[75] Inventors: Richard Crumbach, Aachen; Heinz-Josef Schilde, Wuerselen; Helmut Tiedemann, Baesweiler, all of Fed. Rep. of Germany

[73] Assignee: Saint-Gobain Vitrage, Aubervilliers, France

[21] Appl. No.: 614,037

[22] Filed: May 25, 1984

[30] Foreign Application Priority Data

May 25, 1983 [FR] France .................... 83 08580

[51] Int. Cl.⁴ .............................................. B29D 11/00
[52] U.S. Cl. .................................... 156/212; 156/493; 156/581; 264/1.7
[58] Field of Search .................... 264/1.7, 1.9, 314; 425/808; 156/99, 104, 105, 212, 468, 581, 493

[56] References Cited

U.S. PATENT DOCUMENTS 3,128,322  4/1964  Young .................................. 264/314
3,322,598  5/1967  Marko et al. ........................ 264/1.7
3,769,133  10/1973  Halberschmidt et al. .......... 156/104
4,180,426  12/1979  Oustin et al. ...................... 156/105

FOREIGN PATENT DOCUMENTS 2230599  12/1974  France .
2325483   9/1976  France .
 417726  10/1934  United Kingdom .................. 156/99
 594651  11/1947  United Kingdom .

Primary Examiner—James Lowe
Attorney, Agent, or Firm—Oblon, Fisher, Spivak, McClelland & Maier

[57] ABSTRACT

To cover the concave face of a lens preform with a protective sheet of transparent plastic by an elastic pressing element, the invention proposes inserting an elastic membrane between the pressing element and the protective sheet. Before or during pressing, the membrane is lowered over the preform which has been provided with the protective sheet. As a result of its presence, the entire peripheral area of the protective sheet can be applied homogeneously against the edge of the preform.

15 Claims, 6 Drawing Figures

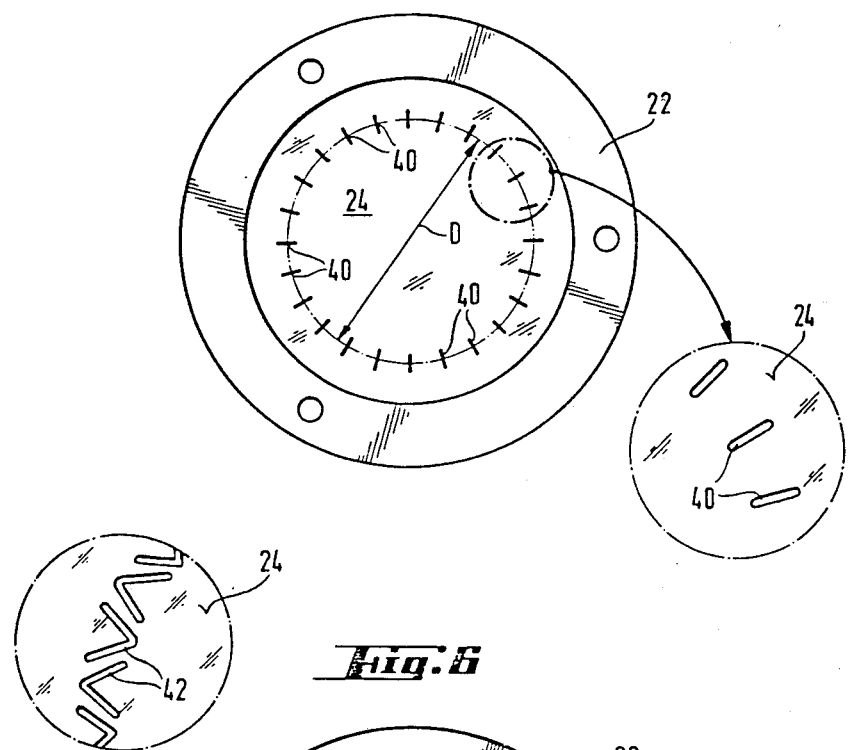
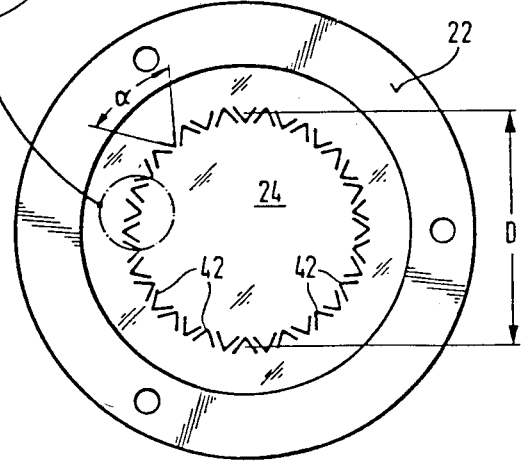

PROCESS AND DEVICE FOR COVERING A LENS PREFORM WITH A PROTECTIVE SHEET

BACKGROUND OF THE INVENTION

1. Field of the Invention

This invention relates to a process for covering the surface of a lens preform with a plastic sheet in which the plastic sheet is applied to the glass preform using an elastic pressing element while eliminating the air therebetween. Optionally, an additional step can be performed to obtain the desired final adherence between the plastic sheet and the glass preform, by applying much higher pressure and temperature conditions.

2. Description of the Prior Art

Processes of this type are used when it is desired to cover protective glass or lenses with a sheet of transparent plastic which is used as an antishattering sheet. For example, German Patent Publication DE AS 26 29 779 describes these anti-shattering sheets which are preferably formed of high elasticity polyurethane having self-recovery properties.

These properties give the sheet a better resistance to scratches which then disappear very quickly. These sheets can also be used for producing plastic glass which is scratch-resistant. The German Patent Publication DE OS 26 34 816 describes, for example, plastic glass thus coated.

The application of these protective sheets to silicate glass or organic (plastic) glass poses certain problems when the surface to be covered is concave. In the first place, there is a risk of a crinkling of the sheet due to the fact that the sheet, flat in itself, must be adapted to a curved surface. Moreover, when convex spherical surfaces are covered, channels are formed, in a direction radial to the pressing element, and in which the displaced air preferably flows out, which causes a poor adherence of the sheet.

Because of specific problems which arise when it is desired to cover spherical surfaces, it has been found that processes in several stages are particularly advantageous. Preferably, a process in three stages is used. French Patent Application No. 82 12 542 describes in detail a method for performing the first stage of the process, i.e., the positioning of a piece of sheet on the glass or plastic preform, and temporary holding of it in this position. At the end of this first stage, there results a preform, of glass or plastic, to which the sheet is attached so that the preform can be handled without the risk of detaching the sheet. Between the sheet and the surface of the preform there is still a relatively large amount of air which must be radially expelled in a second stage.

SUMMARY OF THE INVENTION

The object of the present invention to prevent the formation of channels for evacuation of the air in a preferential radial direction and to obtain a regular flow of the air over the entire periphery of the preform during the second stage of the covering process, where the sheet is pressed by a rubber pressing element in the shape of a spherical cap.

With this in mind, the present invention inserts between the elastic pressing element and the sheet to be coated, an elastic membrane which is superposed on the preform which carries the sheet. The membrane is lowered before or during the pressing operation, as a result of which the entire peripheral area of the sheet can be applied homogeneously against the edge of the preform.

By inserting a membrane and by lowering it onto the sheet to be coated with a predetermined and, if necessary, adjustable pressure force, the formation of channels for evacuation of the air trapped between the preform and the protective sheet in a preferential radial direction is prevented. On the contrary, a constant and uniform resistance to the flow of the air extends over the entire periphery of the preform. The elastic properties of the membrane are, in this respect, decisive in assuring the uniformity of the resistance to the flow; the protective sheet is thus tightened with the same force against the edge of the preform over its entire periphery. The application of the process according to the invention makes it possible to eliminate totally the defects of doubling that can be attributed to the creation of preferential air flow passages.

In a preferred embodiment of the invention, the elastic membrane is pierced, over an area which goes over the edges of the preform, with regularly spaced slots or indentations. They are provided to assure that the protective sheet is pressed uniformly over the periphery of the preform, but also because the pressure is weaker in these indentations, to assure the formation of a great number of possible evacuation paths for the air. Further, the structure of these slots or indentations facilitates the escape of the air which is between the membrane and the protective sheet.

According to one of the advantageous features of the process, the pressure exerted by the membrane over the periphery area is increased with the progression of the application of the elastic pressing element. For this purpose, the periphery of the membrane can be lowered to a level lower than that of the edge of the preform.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 5 illustrates a membrane fitted in a retaining ring with slots arranged in a circle; and FIG. 6 illustrates a membrane of the type of FIG. 5 with a preferred arrangement of the slots.

DETAILED DESCRIPTION OF THE PREFERRED EMBODIMENTS

Figure 1:
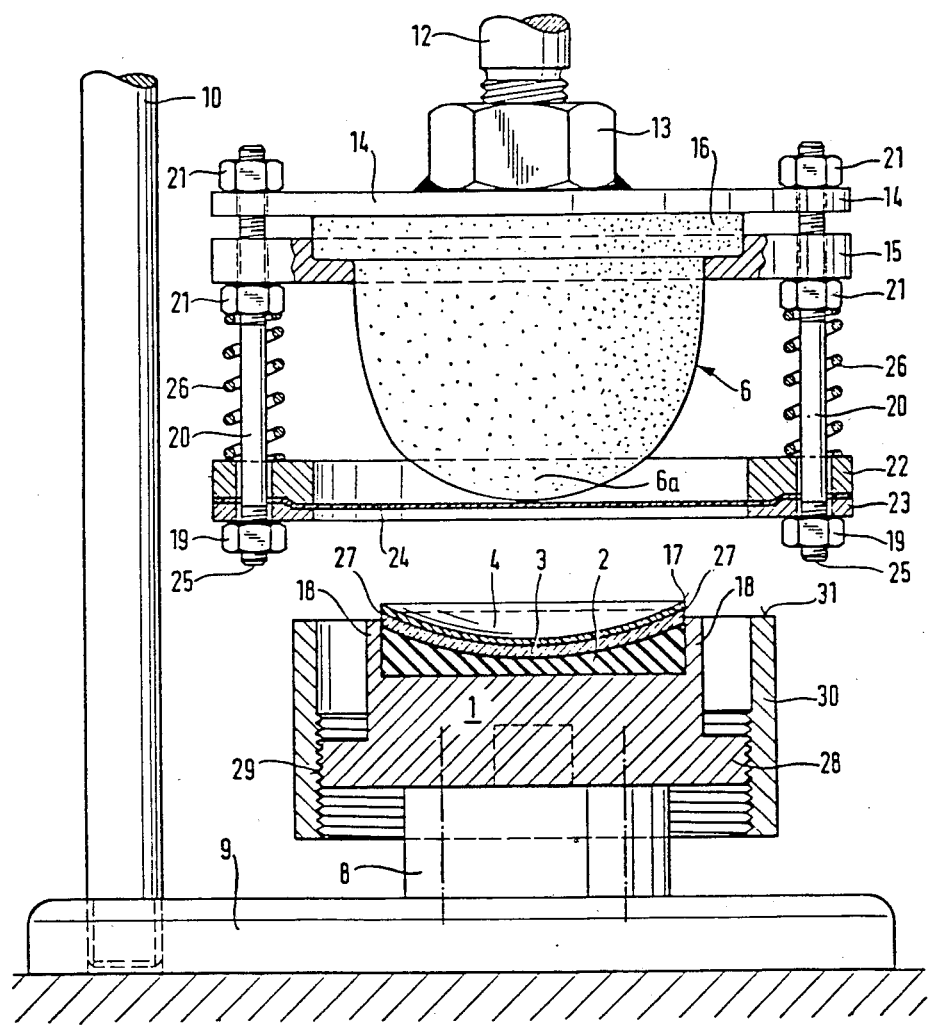
FIG. 1 shows a vertical section of an open mechanical press with an inserted membrane, according to the principle of the invention.
Figure 2:
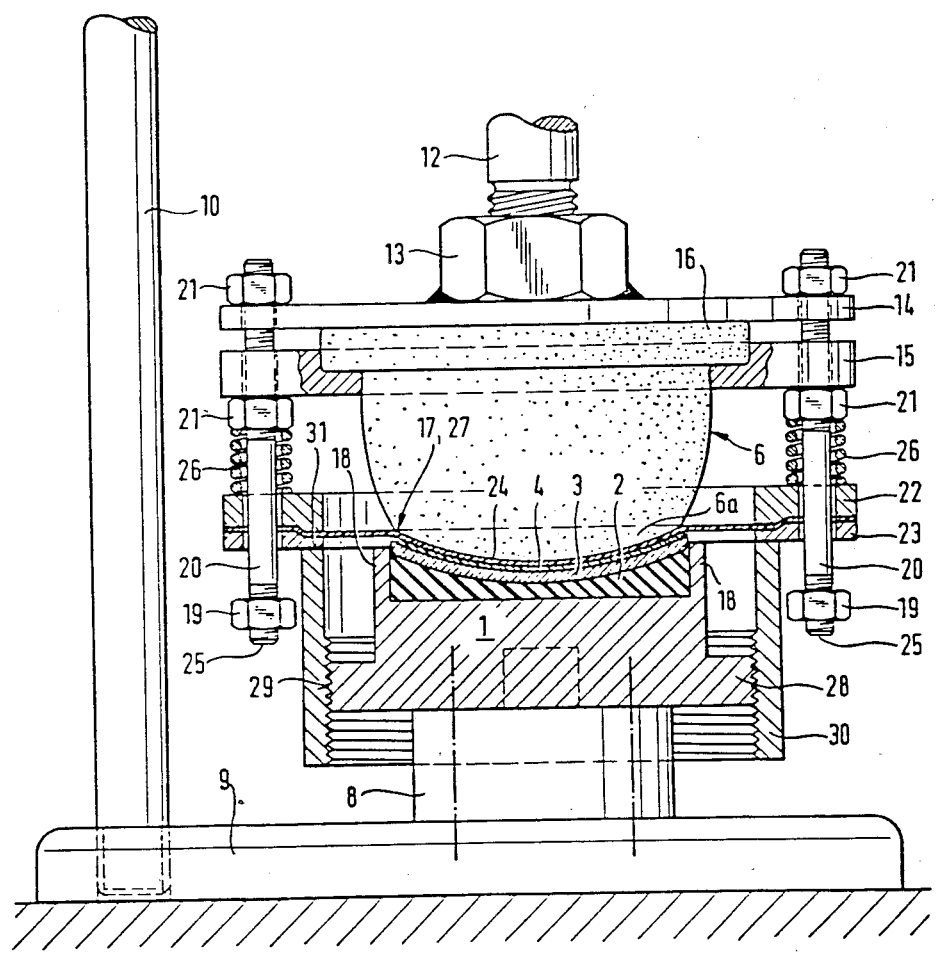
FIG. 2 shows the press of FIG. 1 during operation, i.e., in a closed position.

The press of FIG. 1 comprises a die 1 with a support 2 for the glass preform 3 and a pressing element 6 movable by vertical translation, so as to form a punch. Die 1 is placed on a pedestal 8 which is fastened to a base 9. Post 10 connects base 9 to a convexly curved pressing element 6. A known lever system with slides, not shown in the figure, is fastened to post 10. A shaft 12 to which a support plate 14 is fastened via nut 13, is mounted on this lever system. Collar 16 for attaching pressing element 6 is inserted between support plate 14 and assembly ring 15.

The starting of the press can, depending on the type of construction, be done by hand or automatically. The device for controlling the press for starting is not essential to the understanding of the invention; therefore it will not be described in detail.

Pressing element 6 is composed of a material that can be elastically deformed, for example rubber. Lower part 6a has the shape of a spherical cap and can be a hollow body or any suitable solid body. For example, a silicone rubber possessing a Shore hardness of about 40 can advantageously be used.

Support 2 of glass preform 3 similarly consists of a deformable material, for example the same type of silicone rubber as pressing element 6. The shape of the upper face of this support 2, which serves as a surface for depositing glass preform 3 corresponds to that of the preform. Cylindrical wall 18 of die 1 laterally borders this support.

Screw bolts 20 are arranged so they pass through support plate 14 and assembly ring 15. Two nuts 21 are fitted on the upper threaded portion of these bolts; they make it possible to fasten assembly ring 15 to support plate 14 with collar 16 pressed therebetween. The bodies of these bolts 20 are used to allow that the rings 22 and 23 with essentially planar membrane 24 can slide in vertical direction. The membrane is at such a height that it touches pressing element 6. In this position, retaining rings 22 and 23 rests on nuts 19 which are screwed onto the lower portions 25 of bolts 20. A spiral spring 26 is placed on the body of each of the bolts 20, so that retaining rings 22 and 23 are pushed with adequate force to keep them pressed on the nuts 19.

Die 1 is provided with an annular shoulder 28 having a thread 29 on its cylindrical outside surface. A support ring 30 that can be adjusted in height and that has the shape of a hollow cylinder is screwed onto the thread 29. During pressing, retaining rings 22 and 23 of membrane 24 are placed on this support ring 30. The level of the top surface 31 of the support ring 30 consequently determines the degree of tension of membrane 24 just before the pressing operation itself, and therefore also the force with which membrane 24 is pressed against peripheral area 17 of protective sheet 4, and with which the latter is pressed against edge 27 of preform 3.

The mode of operation and the effectiveness of the apparatus and process according to the invention will be described in relation to FIG. 1. Lens preforms 3 are removed from a supply (not shown), a piece of protective sheet 4 being attached to their concave face, and the convex face of each preform is placed on a substrate 2. The concave face of the preform, provided with protective sheet 4 which can slightly project laterally over edge 27 of the preform, juts over cylindrical wall 18 of the die.

Then punch 6 is then lowered. During this stage, membrane 24 first comes in contact with peripheral area 17 of protective sheet 4 and at this level presses it against edge 27 of preform 3.

In this position, retaining rings 22 and 23 are then supported by support ring 30. Then the punch is lowered more. Membrane 24 first comes in contact with a middle portion of sheet 4 and then is gradually spread against sheet 4 by a continuous deformation from the center, thus causing the escape of air trapped between sheet 4 and preform 3. The force acting on punch 6 increases up to the value necessary for a total surface contact of the membrane 24 on sheet 4 and substantial adherence of sheet 4 to preform 3.

Figure 3:
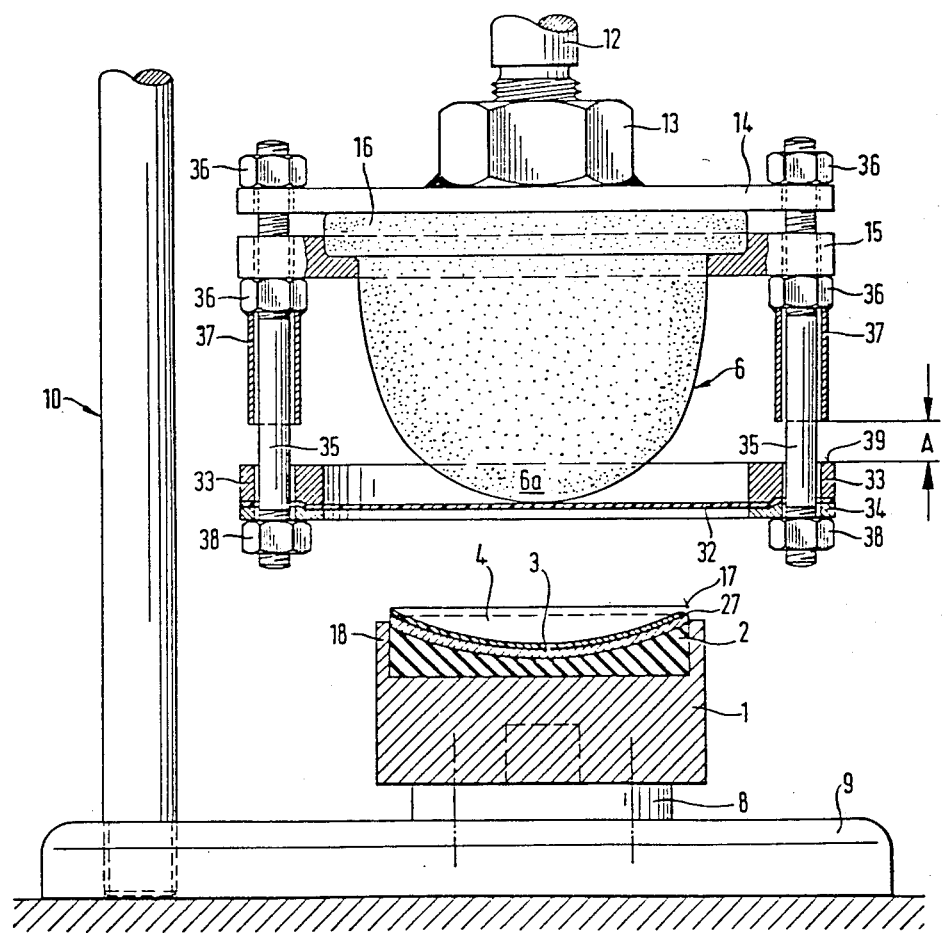
FIG. 3 shows another device for embodying the invention, in an open position.
Figure 4:
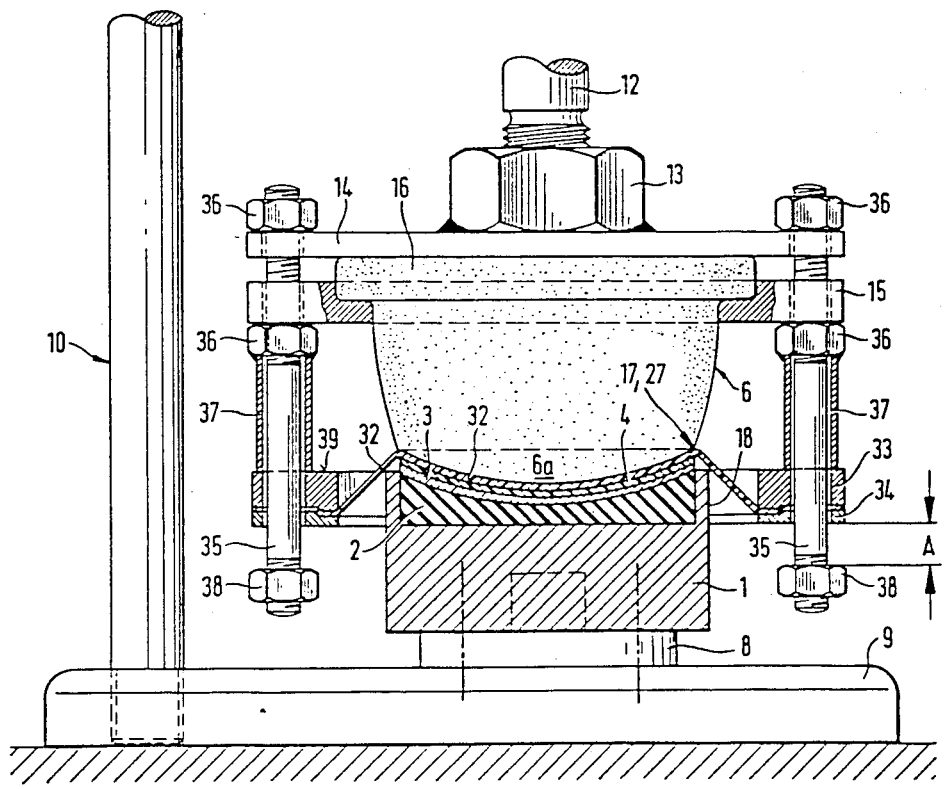
FIG. 4 the device of FIG. 3 in a closed position.

The embodiment illustrated by FIGS. 3 and 4 is identical, in connection with die 1, pressing element 6, its mounting and holding elements, to what has previously been described. Also membrane 32 is fitted between retaining rings 33 and 34 and is movable by sliding along bolts 35. When the press is open, retaining rings 33 and 34 rest on nuts 38 which can be adjusted in height. But in this case, retaining rings 33 and 34 are no longer supported by support ring 30 of FIG. 1 during pressing but, in the final pressing stage, is lowered at the same time as is punch 6, so that the periphery of the membrane is lowered gradually to a level lower than that of the edges of the preform; thus, the tension of the membrane is gradually increased over peripheral areas 17 and 27 thus increasing the pressure exerted by it on these peripheral areas in the last stage of the pressing operation. For this purpose, nuts 36 which connect pressing element 6 to assembly ring 15 are fitted with sleeves 37 which extend over the bodies of bolts 35. Space A between the ends of sleeves 37 and surface 39 of retaining ring 33 limits the relative movement between the retaining rings and the pressing element 6.

During the first stage of pressing, the force applied by the weight of retaining rings 33 and 34, causes the membrane 32 to be pressed against edge 17 of protective sheet 4. When the retaining rings have moved upwards by the distance A relative to the nuts 38, as appears in FIG. 4, further relative movement is prevented by the sleeves 37 and the membrane is increasingly stretched and more strongly pressed against periphery area 17 of protective sheet 4 during further downward movement of the pressing element.

Membrane 24 or 32 is composed of a sheet of silicone rubber, about 1 mm thick and with a high elastic strength. For example, there will be used advantageously in this application, a sheet of silicone rubber whose breaking strength if about 6 to 10N/mm$^2$, and which exhibits a high elongation at breaking on the order of 400 to 800%, and a high resistance to tearing on the order of 100 to 400N/cm.

FIG. 5 shows a membrane 24 held by ring 22 and pierced, on a circle of diameter D, with slots 40. The diameter of the circle corresponds to the diameter of the lens preform 3 that is desired to be covered with the protective sheet 4. The slots, which can instead be indentations in the shape of slots, made in membrane 24 can also, as is shown in FIG. 6, be coupled two-by-two so as to form an angle $\alpha$, the vertex of the angle being alternately radially directed in one direction or the other. As in the above embodiment, these slots are distributed on a circle whose diameter D corresponds to that of preform 3.

During the pressing, slots 40 or 42 pierced in membrane 24 are used to assure a homogeneous flow of the air contained between sheet 4 and the surface of the preform, but they also allow the outward flow of the air trapped between membrane 24 and sheet 4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for covering a concave face of a lens perform with a transparent plastic covering sheet of transparent plastic, said process comprising the steps of:

positioning said covering sheet over said lens concave face;

superimposing an elastic membrane over said sheet; and using an elastic pressing element to press said elastic membrane onto said covering sheet and said lens concave face until said entire lens concave surface is homogeneously contacted by said covering sheet, whereby air between said covering sheet and said lens face is eliminated, wherein said pressing step is performed such that said membrane first contacts an entire peripheral edge of said preform and said elastic pressing element subsequently applies pressure to a central portion of said membrane and covering sheet, said pressure being progressively applied in a radially outward direction as said pressing element is applied to said membrane and covering sheet.

2. The process of claim 1 including a step of lowering a peripheral portion of said membrane below said peripheral edge of said preform during said pressing step, whereby a pressure exerted by said membrane on said peripheral edge of said preform is increased.

3. The process of claim 1 including the step of heating said lens preform having said covering sheet applied thereto, whereby said covering sheet is bonded to said preform.

4. An apparatus for covering a concave face of a lens preform with a transparent plastic covering sheet, comprising:

a frame;

a die upon which said preform is positioned with said concave face facing upward, said die being mounted on said frame;

a support plate mounted on said frame for movement toward and away from said lens preform;

a convexly curved pressing element fixed to said support plate above said lens preform, whereby said pressing element is movable toward and away from said concave face;

retaining ring means supported by said support plate; and a normally planar elastic membrane fixed to said retaining ring means and movable toward and away from said concave face with said pressing element, and positioned between said pressing element and said concave face, whereby said membrane presses a peripheral edge of said lens preform when said support plate is moved toward said concave face and prior to contact between said membrane and a central position of said preform due to pressing by said pressing element.

5. The apparatus of claim 4 including at least one bolt fixed to said support plate and extending towards said lens preform, wherein said retaining ring means is supported by said support plate by being slidably mounted on said at least one bolt, said at least one bolt including an adjustable stop for limiting downward movement of said retaining ring means.

6. The apparatus of claim 4 including a support ring mounted on said die at a position such as it may be contacted by said retaining ring means during downward movement of said support plate, whereby said support ring establishes a lowermost position for said retaining ring means.

7. The apparatus of claim 5 including a support ring mounted on said die at a position such as it may be contacted by said retaining ring means during downward movement of said support plate, whereby said support ring establishes a lowermost position for said retaining ring means.

8. The apparatus of claim 6 wherein said support ring is vertically adjustable.

9. The apparatus of claim 7 wherein said support ring is vertically adjustable.

10. The apparatus of claim 5 including means mounted on said at least one bolt for biasing said retaining ring means downward.

11. The apparatus of claim 9 including means mounted on said at lesat one bolt for biasing said retaining ring means downward.

12. The apparatus of claim 5 including a sleeve mounted on each said at least one bolt and spaced from said stop means, whereby upward movement of said at least one bolt by said retainer ring means is limited by said sleeve.

13. The apparatus of claim 4, wherein said membrane is a sheet with a high elastic strength, said sheet being composed of a rubber-type material having a breaking strength on the order of 6 to $10N/mm^2$, and an elongation at breaking on the order of 400 to 800% and a resistance to tearing on the order of 100 to 400N/cm.

14. The apparatus of claim 13 wherein said membrane is pierced with slots along a circle whose diameter corresponds to that of said lens preform.

15. The apparatus of claim 14 wherein adjoining pairs of said slots form an angle $\alpha$, the vertexes of said angles $\alpha$ being alternately directed in radially opposite directions.

* * * * *